United States Patent [19]

Janssen et al.

[11] 4,349,904

[45] Sep. 14, 1982

[54] ERROR CORRECTION CIRCUIT USING CHARACTER PROBABILITY

[75] Inventors: Peter J. H. Janssen; Wilhelmus J. Christis, both of Eindhoven, Netherlands

[73] Assignee: U.S. Philips Corporation, New York, N.Y.

[21] Appl. No.: 141,546

[22] Filed: Apr. 18, 1980

[30] Foreign Application Priority Data

Apr. 27, 1979 [NL] Netherlands ............... 7903340

[51] Int. Cl.³ ............................................. G06F 11/14
[52] U.S. Cl. ........................................ 371/69; 371/31
[58] Field of Search .................... 371/69, 48, 31, 22

[56] References Cited

U.S. PATENT DOCUMENTS 3,938,081 2/1976 Kirk ....................................... 371/48
4,054,863 10/1977 Goodman et al. .................... 371/31
4,224,689 9/1980 Sundberg ......................... 371/31 X

OTHER PUBLICATIONS

Stolz et al., "A Stochastic Approach to the Grammatical Coding of English", *Communications of the ACM*, vol. 8, No. 6, Jun., 1965, pp. 399–405.

*Primary Examiner*—David H. Malzahn
*Attorney, Agent, or Firm*—Thomas A. Briody; William J. Streeter; Edward W. Goodman

[57] ABSTRACT

An error correction circuit in a television receiver for receiving, for example, Teletext information, Viewdata information or information of comparable systems. The codes representing symbol information received by the receiver are classified into one out of two or more classes in dependence on the frequency of their occurrence, this classification being an indication of the extent to which it is probable that a received code is correctly received.

In FIG. 1, a picture text television receiver has a receiving section, audio and video amplifiers 4 and 9 and a picture tube 10, 11. A text decoder 21 receives symbol information which is stored in a store 25 for display. An error detector circuit 40 including a comparison circuit 43 and two parity circuits 41 and 42, and checks for parity between newly received and already stored symbol information. A reliability circuit 60 is also included.

7 Claims, 2 Drawing Figures

ERROR CORRECTION CIRCUIT USING CHARACTER PROBABILITY

BACKGROUND OF THE INVENTION

The invention relates to an error correction circuit of a type suitable for a receiving device for receiving digitally transmitted symbol information (picture and/or text), the transmission of this information being repeated one or more times, the receiving device comprising a decoding circuit for decoding the received information, an information store for storing the information, a circuit for generating synchronizing signals and a video converter circuit for converting information and synchronizing signals for applying a composite video signal to a standard television receiver, a symbol address in the information store corresponding with a symbol location on a television picture screen, a symbol location being a portion of a text line which is displayed with a number of videolines greater than one, the error correction circuit comprising means for checking newly received symbol information against symbol information stored in the information store for the corresponding symbol location, together with a write-switch having a write-setting circuit which determines whether the newly received information is written or not written into the information store, the position of the switch being determined on the basis of the result of said checking.

Error correction circuits of the above type are used in auxiliary apparatus for the reception of Teletext transmissions or comparable transmissions, these auxiliary apparatus being connected to a standard television receiver either by applying video signals to a so-called video input, or by applying these video signals, modulated on a carrier, to an aerial input of the television set. There are already television receivers with a built-in Teletext receiver already including an error correction circuit of the above-mentioned type.

The present Teletext system as it is already used rather widely in the UK, is based on an 8-bit symbol teletext code having 7 information bits and 1 parity bit; this parity bit is chosen so that each 8-bit symbol in the code has a so-called "odd" parity, that is to say there is an odd number of ones in a symbol, and, consequently, also an odd number of zeros. A display on the television picture screen comprises a "page" consisting of a number of rows (e.g. 24) of symbols.

Only symbols with the "odd" parity are stored in the information store. Each symbol represents either an alpha-numeric or a graphics character for display on the picture screen, or a control symbol.

If, in a subsequent transmission cycle for the same symbol location of the same page, a faulty symbol is detected, then, assuming that only a single error occurs within a symbol, this faulty symbol will have an even parity, that is to say a "one" changed into a "zero", or vice versa, as the result of the error. In this case the information store is not written into and the old information is retained in the relevant symbol address.

As the probability is very great that this old information is correct, the parity check does not only furnish an error detection, but also an error correction, partly because of the fact that some knowledge has already been gained from the previous history. Of course, this does not hold for the first transmission cycle. Should an "even" parity be found in a 8-bit symbol in the first transmission cycle, a space ("blank") is generally recorded in the relevant symbol address and, consequently, displayed as a space. The easiest way to do this is by filling the entire information store with space symbols when a new Teletext page is requested, so that also in the first cycle no information need be written into the information store on receipt of a symbol having an "even" parity.

For a poor transmission condition an error probability of 0.01 is assumed, that is to say one symbol out of a hundred symbols is received incorrectly. In a complete page having 960 Teletext symbol locations, (i.e. up to 24 rows of up to 40 symbols per row) the displayed page then shows, after the first cycle, 9 to 10 erroneous spaces on average. In the present system substantially all these erroneous spaces are likely to have been corrected in the second cycle.

When the receiving conditions are better, this situation is already correspondingly more favourable in the first cycle. Even in the poorest receiving conditions, it appears that the number of double errors is so small that they may be neglected. Double errors therefore are hardly ever taken into consideration hereafter. It will be apparent that in this system each symbol has a certain degree of redundancy in the form of the parity bit, but this is off-set by the drawback that the 8-bit code, which has 256 ($=2^8$) combinations, is utilized for only 50% of this capacity, i.e. only for the 128 symbols having "odd" parity.

Although, for the U.K. itself, such a code has a sufficient capacity to contain all desired symbols for control, graphics elements, letters, figures, punctuation marks, etc. as required for Teletext and also, for example, for Viewdata, it is not possible to allot a specific symbol to all of the special characters occurring in various other languages.

Several European languages, in so far they are written in latin characters, have all sorts of "extra" characters, for example Umlaut letters, accent letters, etc. When all these extra characters are totalled, including Icelandic, Maltese and Turkish, then it appears that a total of approximately 220 symbols is required, namely the 128 known symbols plus further symbols for these "extra" characters.

Several solutions have been proposed to solve this, but so far none of these have been satisfactory as they are either very cumbersome or allow only one language within one page, so that it is impossible or very difficult e.g. to quote foreign names in a page of text.

Alternatively it has been proposed—and this is of course very obvious—to use the entire 8-bit code for symbols. As the redundancy in the code has now been reduced to zero, no correction can be effected in the second cycle. If two codes for one symbol location differ from one another in different transmission cycles, it is theoretically impossible to decide with certainty which one of the two codes is correct. An additional information store is required to enable a comparison between a newly received symbol in the third cycle and a symbol from the second and the first cycles, and to take the frequently used majority decision thereafter. This is possible, but three reading cycles are necessary before the number of errors is reduced to an acceptable level. As each transmission cycle of a completely full magazine (i.e. a plurality of pages) takes approximately 25 seconds, the correct text is not known until after approximately 75 seconds.

As the present system displays the text correctly after approximately 50 seconds already, such a solution would mean an increase in the so-called access time.

If a new parity bit were added to the 8-bit code, each symbol would require $8+1=9$ bits so that it is no longer possible, as is done in the present system, to accommodate the symbols for one text line of 40 characters in one video line, whereas on the other hand the average transmission rate decreases if more video lines are needed for the information transmission. This solution is generally considered to be unacceptable, also because the compatibility with existing receivers would be fully lost.

Although any language to be displayed can be considered to contain redundancy both as regards text and graphics, so that a viewer may "overlook" many errors, in the sense that there is still an intelligible display, this does not offer a satisfactory solution.

SUMMARY OF THE INVENTION

It is the object of the invention to provide an error correction circuit of the type referred to for a receiving device for Teletext and comparable systems, which offers such a solution for the problem outlined above that also for an 8-bit code without a parity bit substantially all errors, if any, can be corrected in the second transmission cycle which is received.

According to the invention an error correction circuit of the type referred to is characterized in that it comprises at least one classification circuit for classifying a newly received and decoded symbol in one of at least two classes on the basis of the probability of occurrence of the newly received symbol, an output of the classification circuit being coupled to an input of the write-setting circuit.

The classification circuit utilizes the hitherto unrecognized fact that the "language" used for the Teletext system and for associated systems comprises a third form of redundancy, namely the frequency with which the different symbols occur in any random text.

From counts performed on longer texts in several languages, including texts that quote words or names from other languages, it is found that, on average, these texts did not contain more than approximately 5% "extra" symbols, in spite of the fact that the extra symbols constitute approximately 50% of the different code combinations. The remaining 95% are symbols from the original 50% of the different code combinations, that is to say control, graphics and text symbols which were already used in the existing system. For simplicity, these latter symbols are hereinafter denoted A-symbols, and the "extra" symbols are denoted B-symbols.

If now an A-symbol is received in the first cycle and a B-symbol in the second cycle, or vice versa, it is already possible to decide with a high degree of certainty which of the two is correct.

Let us assume that an identified A-symbol is transmitted from the transmitter end for the same symbol location in those first and second cycles, whereas the receiver receives an A-symbol in the first cycle and a B-symbol in the second cycle.

It can be seen that some form of A-symbol is obtained in the receiver when either a real A-symbol is properly received or a real B-symbol is erroneously received. Assuming there is an error probability of 0.01, the probability that the first-mentioned situation occurs is $0.95 \times 0.99 = 0.9405$ and the probability that the second situation occurs is $0.05 \times 0.01 = 0.0005$ so that the probability that an A-symbol is received totals 0.941. A B-symbol results from a real B-symbol ($0.05 \times 0.99 = 0.0495$) or a faulty A-symbol ($0.95 \times 0.01 = 0.0095$), adding up to a total probability of 0.059. Of course $0.941 + 0.059 = 1.000$, based on the assumption that double errors do not occur, so that any A-symbol $A_x$ will never be received as another A-symbol $A_y$ from the same class. The probability that a received A-symbol is correct is $0.9405/0.941 = 0.9995$. The probability that a received B-symbol is correct is $0.0495/0.059 = 0.839$.

For the above mentioned case, it is correctly assumed that the A-symbol in the first cycle is correct, and that the B-symbol in the second cycle is incorrect.

Consequently, there is an A-symbol in the information store in both cycles. In the second cycle the B-symbol must not be stored, and the A-symbol obtained from the first cycle must be retained.

Should a B-symbol be received first, then a B-symbol is written into the information store, (the probability that this B-symbol is correct is still 84%) but it is not retained in the second cycle, and the A-symbol received in the second cycle must now be recorded in the information store.

At the end of the second cycle it is seen that in this manner the then remaining error is less than one in approximately 5 full pages, as applied to the Teletext system. Such a number of errors is so small that apparently they are not noticed by a viewer.

When an A-symbol is received in the first cycle and in the second cycle or a B-symbol is received in both cycles then there is no doubt, after symbol sequences A, B or B, A there is little doubt, but the symbol stored in the information store must be considered to be somewhat suspect. This also applies to each B-symbol recorded in the first cycle, which may lead to a further improvement when a decision is taken.

Another advantageous embodiment of an error correction circuit according to the invention is characterized in that the error correction circuit comprises a reliability circuit and the information store comprises an additional storage element for each symbol address in the information store for storing a reliability bit associated with that symbol address, inputs of the reliability circuit being coupled to the classification circuit and to a read circuit for the additional storage elements, for determining from the additional storage element corresponding with the symbol address of newly received symbol information a new reliability bit, this new reliability bit being written at least into the corresponding additional storage element when the reliability bit for this symbol address changes its value.

When the transmitter successively transmits an A-symbol for a certain symbol and location and symbols ABA are successively received, then the A-symbol may be recorded as being "non-suspect" after the first cycle, indicated by an R (reliable) hereinafter. An R' after the second (A), the brackets indicating that the information is retained (not written into the information store) indicates the assumed non-reliability of this retained (A)-symbol, and an A and an R in the third cycle indicates the reliability of the correctly received A-symbol. The A-symbol in the information store is now again assumed to be reliable for this symbol sequence.

In like manner, when the transmitter transmits a B for a certain symbol location, and the symbols B, A, B, B are successively received, symbols and reliability states B. R', A.R', B. R' and B.R are recorded.

All this depends on the decision logic opted for.

It is assumed here that the possibility of an error for the same symbol location in two consecutive cycles is also extremely small; when the transmitter transmits symbols A, A, A, A in successive cycles, the probability that the receiver would receive, for example, symbols A, B, B, A is assumed to be zero. From practical experiments it was seen that this form of a double error can be fully neglected.

This improvement makes it of course necessary for reliability state R or R' to be retained together with the related symbol in the information store and that it must be revised every cycle, if necessary. Each symbol address now has 9 bits instead of 8 in the Teletext receiver memory. This has hardly any consequences for the price as a standard RAM having a capacity of 1kx9 can be used.

As is apparent from the foregoing examples, it can be advantageous to make different decisions in the case a symbol sequence B-A is formed after the first cycle or after a further cycle.

A further advantageous embodiment of an error correction circuit is characterized in that the error correction circuit comprises a counting circuit for counting information transmission cycles following a new request for (always) a full picture of the requested symbol information, a counting output of this counting circuit being coupled at least to another input of the reliability circuit, this counting output being, for example, also coupled to a further input of the write-setting circuit.

As seen earlier in the history of data transmission and information processing equipment, the need was felt also for Teletext and comparable systems, to realise the extension with new symbols by doubling the number of symbols identified by an n-bit code, in such a way that the original symbols retain as far as possible their existing bit combustion.

This results inter alia in that transmission in a new, extended, code are also displayed reasonably well by existing receivers. A receiver for the original symbols only allots the correct symbol to approximately 95% or more of the symbol locations in the display. A limited compatability is therefore still possible, and even a full compatibility if a normal "English" text is transmitted.

In the example considered herein all the original symbols remain the same, and all the "extra" symbols have even parity.

This symbol set is now under discussion as an international standardization proposal.

It will be apparent that in the last-mentioned case no intricate classification circuit is required to decide for each symbol whether this symbol must be allocated to the A or to the B group.

A further advantageous embodiment of an error correction circuit according to the invention is therefore characterized in that the classification circuit comprises a parity circuit for classifying newly received symbols for respective particular symbol locations into one of two classes which correspond to an even and an odd parity, respectively, of the newly received information, and for classifying symbol information already stored in the corresponding symbol addresses in the information store.

This results, at first sight, in very strange circuit, as now a parity check is performed on a code which contains no parity bit at all.

It is, of course, alternatively possible to record the relevant classification of a symbol in the information store, but this requires at least a tenth bit for each symbol address and, for a classification in more than two groups, it requires even more. It is, however, more advantageous, when a newly received symbol for a particular symbol location is compared with the symbol already stored in the corresponding symbol address of the information store, to determine the classification of the symbol again when it is read from the address, as this requires less material and the advantage that a standard 1 Kx9 RAM can be used is retained.

A further advantageous embodiment is characterized in that the error correction circuit comprises a second classification circuit for classifying a symbol read from the information store.

In the most advantageous case, wherein all extra symbols are even parity codes, this means a second parity check circuit.

In the case that classification in two classes coincides with an even and an odd parity, respectively, of the symbols, it furthermore appears to be possible to enter the classification in the information store in such a way that the notation of the classification does not require an additional storage bit.

An embodiment of an error correction circuit according to the invention, which is advantageous for this case, is characterized in that the error correction circuit comprises a modification circuit which after having determined the "0" or "1" parity value of a newly received symbol means of the parity circuit replaces the content of a fixed bit position of the newly received symbol by this parity value.

Any random bit can be selected as the fixed bit position in the symbol, for example, the eight bit in the case of an 8-bit symbol, whereas a ninth bit is used as, for example, the reliability bit.

There are four distruct possibilities:

TABLE I

| Class | Symbol (n+1) | Parity | Modified symbol (n+1) | Parity |
| --- | --- | --- | --- | --- |
| A | xxxxxxx 1 | 1 | xxxxxxx 1 | 1 |
| A | xxxxxxx 0 | 1 | xxxxxxx 1 | 0 |
| B | xxxxxxx 1 | 0 | xxxxxxx 0 | 1 |
| B | xxxxxxx 0 | 0 | xxxxxxx 0 | 0 |

In this case only one 8-bit parity circuit is needed.

It is of course alternatively possible to realize the second classification circuit virtually by using the first classification circuit twice on a time-sharing basis, first as the first and then as the second classification circuit. This requires some additional control logic and some additional time, so that the provision of a second classification circuit will be preferred, especially in the case where a simple parity check is performed.

The above-mentioned solution with its possible extensions will furnish the best result if all these extensions are provided. This is at the same time the most expensive solution. Error correction circuits which do not have all the above-described extensions are cheaper and hardly less good.

DESCRIPTION OF THE DRAWINGS

One specific combination will now be discussed in greater detail by way of example with reference to the drawings. On the basis thereof, any other combination can be easily implemented by one skilled in the art.

In the drawings.

DESCRIPTION OF THE PREFERRED EMBODIMENT

Figure 1:
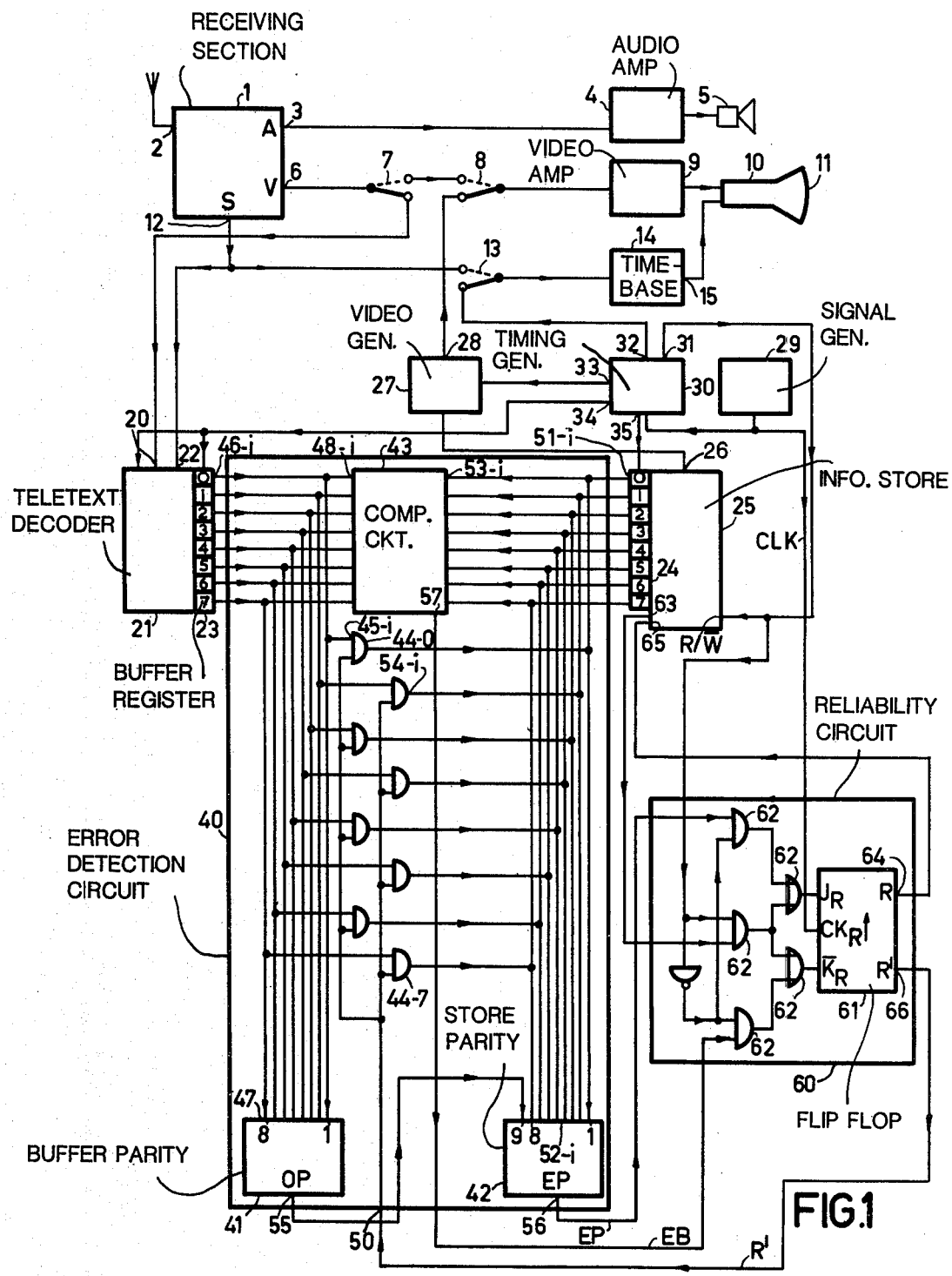
FIG. 1 shows a simplified block diagram of a television receiver comprising a Teletext receiving section including an error correction circuit according to the invention.

The embodiment chosen for FIG. 1 is suitable for reception in accordance with the proposed new code and comprises two clasification circuits consisting of two parity circuits, a comparison circuit for the bit-wise comparison of two symbols, a reliability circuit comprising a reliability flipflop and, in addition, the elements already known for a television plus Teletext receiver.

FIG. 1 shows a television receiver by means of a simplified block diagram.

A receiving section 1 having an aerial input 2 comprises the high-frequency receiving section, the intermediate-frequency amplifier section, the detection and the synchronizing circuits of the receiver. An audio output 3 is coupled to one or more loudspeakers 5 via an audio amplifier 4. Via control switches 7 and 8 a video output 6 is coupled for normal television reception to a video amplifier 9 for a picture tube 10 comprising the picture screen 11. Via a control switch 13 a synchronizing output 12 is coupled during normal television reception to a time-base circuit 14 which supplies the deflection voltages for the picture tube 10 via an output 15.

However, the control switches 7, 8 and 13 are shown in the position for Teletext reception and display.

Via the switch 7 the video signal is applied to an input 20 of a Teletext decoder 21, a synchronizing input 22 of which is coupled to the synchronizing output 12 of the receiving section 1.

In the Teletext decoder 21, serially received Teletext symbols are successively entered in parallel into a buffer register 23 thereof. Depending on the action decided upon, the contents of the buffer register 23 can be transferred to a storage register 24 of an information store 25, and from the storage register 24, the consecutive symbol addresses each corresponding to a symbol location on the picture screen 11 are filled, until the entire information store 25 is filled with the symbol information which corresponds to the desired Teletext page.

This and also the further processing operations are fully in agreement with the existing Teletext system. Addressing, reading of the information store, etc. are therefore not further described.

An output 26 of the information store 25 is coupled to a video (Teletext) generator 27, an output 28 of which is connected to the video amplifier 9 via the switch 8. In addition, there is provided in known manner a signal generator 29 and a generator 30 for generating several timing signals required in the receiver, which are applied to several other elements via outputs 31 to 35, inclusive. Synchronizing signals which can be applied to the time-base circuit 14 via the switch 13 are produced at the output 32.

The decision whether the content of the buffer register 23 must be transferred or not transferred to the storage register 24 is taken by an error correction circuit, which would, in the known Teletext system, consist of a parity check circuit.

The error correction circuit according to the invention consists of an error detection circuit 40 and, in the specific embodiment being described, a reliability circuit 60. The error detection circuit 40 comprises a parity circuit 41 for the buffer register 23, a parity circuit 42 for the storage register 24, a comparison circuit 43 for comparing the contents of buffer and storage registers 23, 24 with one another, and a number of write switches 44-0 to 44-7 inclusive. In this example these write switches are represented as respective AND-gates each having two inputs and an output. An input 45-$i$ of each of the write switches is always connected to a corresponding output 46-$i$ of the buffer register 23, these outputs also being connected respectively to inputs 47-1 to 47-8 inclusive, of the parity circuit 41 and to inputs 48-0 to 48-7 inclusive, of the comparison circuit 43.

The other input 49-$i$ of each of the write switches is connected to a common write command input 50 of the error detection circuit 40.

In addition, output 51-$i$ of the storage register 24 are connected to respective inputs 52-1 to 52-8 inclusive, of the parity circuit 42 and to corresponding further inputs 53-$i$ of the comparison circuit 43 and to outputs 54-$i$ of the write switches 44-0 to 44-7.

An odd parity-output 55 ("1" for odd-parity) of the parity circuit 41, is connected to an input 52-9 of the additional parity circuit 42, which has an output 56 for even or odd parity at the inputs 52-1 to 52-9, inclusive.

A Signetics IC No. 54180 or No. 8262 may, for example, be used for the parity circuit 41. If the parity of the symbol in the buffer register 23 is odd or even, a "1" and "0", respectively, appears at the output 55.

A Signetics IC No. 8262 may also be used for the parity circuit 42. If the parity of the symbol in the storage register 24 is odd and a "1" has appeared at the output 55, then a "1" appears at the output 56 for the even parity of the parity circuit 42, that is to say both symbols had an odd parity. If both symbols have an even parity the input 52–9 receives a zero, so that the total number of ones is even again and the output 56 shows an "1" again. Should the parities of the buffer register 23 and the storge register 24 be unequal, then the output 56 shows "0".

Thus the output 56 (Even Parity) may be considered to be an output which indicates by means of the "1", that the investigated symbols have an equal parity (Equal Parity, EP).

The comparison circuit 43 has an output 57 which becomes a "1" as soon as all the bits of the compared symbols are mutually equal. The signal thus obtained will be denoted EB (Equal Bytes).

The reliability circuit 60 comprises a flipflop 61 having number of writing gates 62. A $\overline{JK}$ flipflop is chosen for the described example but this is not essential to the inventive idea. One half of a Signetics 54112 may, for example, be used as a $\overline{JK}$ flipflop. Descriptions, truth tables and time diagrams of the above-mentioned Signetics circuits are known from the Philips Signetics Data Handbook.

The reliability circit 60 satisfies the following equations:

$CK_R = CLK$, obtained from the clock signal generator 29.

$$J_R = R/\overline{W} \cdot R_G + (R/\overline{W})' \cdot EP \qquad (I)$$

$$\overline{K}_R = R/\overline{W} \cdot R_G + (R/\overline{W})' \cdot EB \qquad (II)$$

in which $R_G$ is the reliability status as stored in the memory 25,

The operation of the J$\overline{\text{K}}$-flipflop can be explained as follows, reference also being made to the time diagram of FIG. 2.

Within successive periods of approximately 25 seconds the symbols for 960 symbol locations (i.e. a page of text) are repeatedly received. The solid line sections 100 represent the symbol processing of the symbol $S_x$ in consecutive cycles 0 to 7, inclusive, indicated as $S_{x,0}$ to $S_{x,7}$ inclusive. The broken line sections represent in a very concise manner the processing of $S_0$ to $S_{x-1}$, inclusive, and $S_{x+1}$ to $S_{959}$, inclusive, one processing period comprising, for example, two cycles of the clock signal 101 of the clock signal generator 29 and one read/write cycle consisting of the portions R/$\overline{\text{W}}$ and (R/$\overline{\text{W}}$)', read and write respectively, controlled by the signal 102, obtained from the output 31 of time signal generator 30. During the read portion 103 of cycle 102 the contents of a symbol address which correspond with the signal combination entered in the buffer register 23 for a given symbol location, is entered into the storage register 24. As each symbol address has a ninth bit for a reliability bit, a status value $R_G$ appears simultaneously at an output 63 of the information store 25. On the first rising clock edge 104 only the first terms of the equations I and II are operative, as R/$\overline{\text{W}}$="1" and consequently (R/$\overline{\text{W}}$)'="0". This means that at the instant 104 the flipflop 61, R assumes the value "1" when $R_G$="1" and the value "0" when $R_G$="0", as shown in the line sections 105. At the next clock edge 106 only the second terms are operative, and the flipflop 61 can now retain the previously adjusted value or assume the other value. This final value at the output 64 of the flipflop 61 is applied to an input 65 of the information store for writing a next $R_G$ in the ninth bit of the corresponding storage address.

Figure 2:
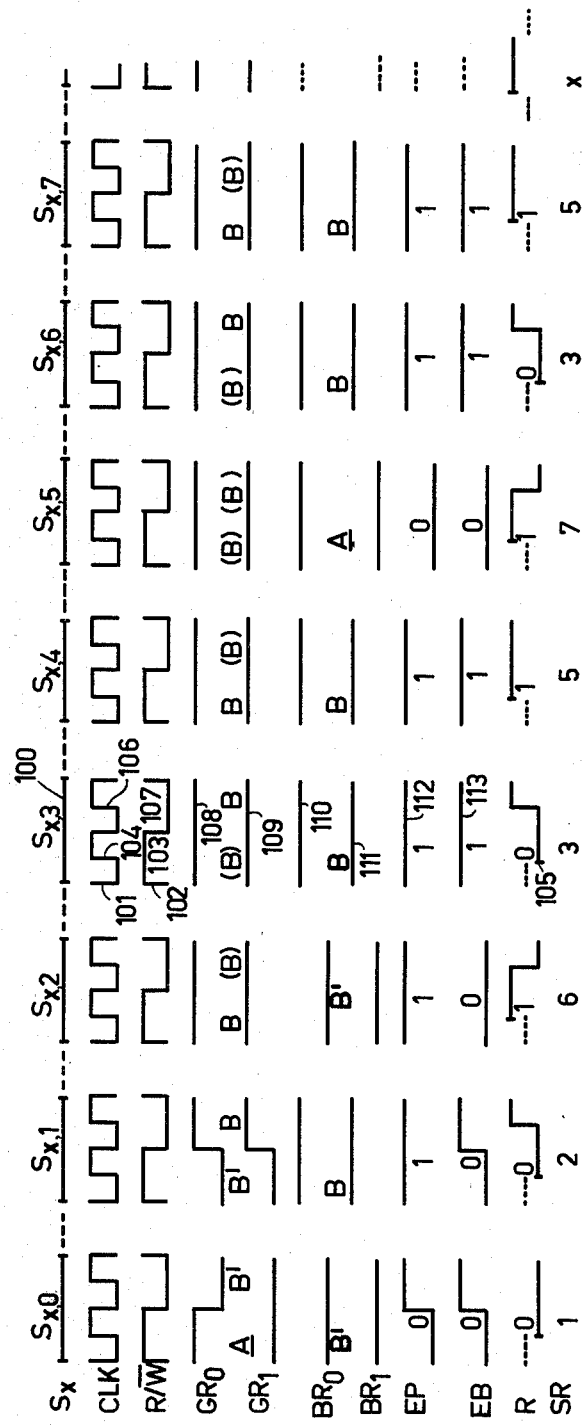
FIG. 2 shows a simplified time diagram in which a number of different error combinations is shown in an exaggerated burst of errors.

The output 66 (R') of the flipflop 61, which is connected to the write command signal input 50 of the error detection circuit 50, further determines whether the contents of the buffer register 23 can be transferred to the storage register 24 during the write cycle 107 (see FIG. 2).

Finally, the lines 108, 109 of FIG. 2 represent two bit contents of the storage register and 110, 111 represent two bit contents of the buffer register. For clarity's sake the remaining bits have been omitted.

The signal EP is denoted by 112, and the signal EB by 113.

In this example the following set of decision rules has been realised in the circuit.

TABLE II

| Decision SR | EP | EB | Read $R_G$ | Write 23→24 | Written | $S_R$ | $K_R$ |
|---|---|---|---|---|---|---|---|
| 1 | 0 | 0 | 0 | 1 | 0 | 0 | x |
| 2 | 1 | 0 | 0 | 1 | 1 | 1 | x |
| 3 | 1 | 1 | 0 | 1 | 1 | 1 | x |
| 5 | 1 | 1 | 1 | 0 | 1 | x | 1 |
| 6 | 1 | 0 | 1 | 0 | 0 | x | 0 |
| 7 | 0 | 0 | 1 | 0 | 0 | x | 0 |
| (4) | 1 | 0 | 0 | 1 | 0 | 0 | x |

The states, indicated by an x, of $J_R$ and $\overline{K}_R$ are irrelevant for the position of the flipflop. The equations I and II have been chosen thus that the required values "0" and "1" for $J_R$ and $\overline{K}_R$ are produced.

FIG. 2 shows the states and EP, EB and R in the line sections 112, 113 and 105, respectively, by means of an example which shows an unprobable burst of received errors, such that each one of the decisions occurs at least once.

When the first cycle starts, the entire information store 25 is filled with space symbols. The space symbol is an A-symbol, denoted in FIG. 2 by $\underline{\text{A}}$. It is assumed that the transmitter transmits a B-symbol and continues to do so. A faulty B-symbol has the same parity as $\underline{\text{A}}$ and is denoted by B'. On the basis of decision 1, EP=0, EB=0 and $R_G$="0" in the second half of the cycle a B' (erroneously received B with an even number of errors) is written into the storage register 24. The new $R_G$ remains "0" because $J_R$=0, $\overline{K}_R$=x.

In the next cycle the buffer register 23 contains a correctly received B, which is transferred to the storage register 24 in accordance with decision 2.

The further cycles need no explanation. (B) indicates when there is *no* transfer to the store. The B already present in the relevant symbol address is not changed.

Throughout the example of the transmitter
transmitted: B B B B B B B B
received: B' B B' B B $\underline{\text{A}}$ B B
dislayed: $\text{\textcircled{B}}$ B (B) B B (B) B B The displayed error B' in the first cycle can of course not be avoided in this example, all following results are correct.

Any other possible received sequence can be followed in a similar manner.

Two of the decisions need some further explanation.

Decision 2 with EP="1" and EB="0", seems to indicate a multiple and, consequently, very rare error. As the information store 25 is initially filled with $\underline{\text{A}}$'s and the probability that an A will be received is high, this "error" will occur very frequently, especially in the first cycle.

Any double error occurring at a later instant will be treated likewise, in that very rare event.

Decision 6 deals with an equally rare event, but with $R_G$="1". It shortens the elimination of a multiple error, but will be rarely necessary. However, this decision 6 can be combined cheaply with decision 7.

In the embodiment explained on the basis of Table I the processing of EP in particular is simplified.

The following simple process can now, for example, be applied.

A newly received symbol is applied to the input of the parity circuit 41.

If the newly received symbol (n+1) is a symbol from the A group, then the parity circuit 41 indicates an odd parity that is to say a "1" at the output "odd parity".

This "1" is transferred to the eight bit of the buffer register 23.

By comparing a corresponding symbol (n) from the information store 25 with a modified symbol (n+1), EP can now be found by comparing the two eights bits of the buffer register 23 and the storage register 24. EB can be determined as previously to detect whether there is or there is not a difference between the two (modified) symbols.

In dependence on EP, EB and R, it is decided in a conventional manner whether the modified symbol will be written or not written into the information store 25. Thus the information store 25 comprises modified symbols only, so that in checking with the comparator 43, this check must be made against the also modified, newly received symbol.

During the display of the page, the parity circuit 41 is available for remodification, it only being necessary to invert the eighth bit if the eighth bit of the symbol to be displayed differs from the parity of this symbol, that is to say it is sufficient to replace the eighth bit of the storge register 24 by the parity now found.

A slight improvement can still be obtained by means of the additional decision (see at the bottom of the Table II). However, to enable the use of this additional decision, instead of decision 2 which can then only hold for the first cycle, a cycle counter must now be incorporated which forms with New Request="1" an additional condition for decision 2 and which, in all subsequent cycles with NR="0" results in decision 4 when EP=1, EB=0 and $R_G=0$.

In view of what was described herefore such an extension can be easily realized by one normally skilled in the art of logic design.

In extremely rare cases this embodiment results in a further small improvement.

A simplified embodiment produces for all normal single errors an equally satisfactory result but it deals with the multiple errors in a less satisfactory way. However, the total result remains very satisfactory for the user.

The entire comparison circuit is omitted from this simplified embodiment. The decision table is now reduced to:

TABLE III

| Decision | EP | Read $R_G$ | Write 23-24 | Written $R_G$ |
|---|---|---|---|---|
| 1A | 1 | 0 | 1 | 1 |
| 2A | 1 | 1 | 1 | 1 |
| 3A | 0 | 0 | 1 | 0 |
| 4A | 0 | 1 | 0 | 0 |

Again this embodiment can be easily realized by one normally skilled in the art, using what has been described herein.

The same applies if smll changes are desired in the decisions, and also when, for example, the circuit must be implemented in the form of one or more Large Scale Integrated circuits (LSI), or when it is realized wholly or partly by means of a micro-processor.

What is claimed is:

1. An error correction circuit for a receiving device for receiving digitally transmitted symbol information, the transmission of this information being repeated one or more times, the receiving device having a decoding circuit for decoding the received information, an information store coupled to said decoding circuit for storing the information, a circuit for generating synchronizing signals and a video converter circuit coupled to said information store and said generating circuit for converting information and synchronizing signals into a composite video signal for application to a standard television receiver, a symbol address in the information store corresponding with a symbol location on a television picture screen, a symbol location being a portion of a text line which is displayed with a number of video lines greater than one, the error correction circuit being coupled to said decoding circuit and said information store and including means coupled between said decoding circuit and said information store for checking newly received symbol information against symbol information stored in the information store for the corresponding symbol location, a write-switch having one input coupled to said decoding circuit and an output coupled to said information store, and a write-setting circuit, coupled to another input of said write-switch, which determines whether the newly received information is written or not written into the information store, said write-setting circit having an input coupled to said checking means whereby the results of said checking are a factor in the setting of said write-switch by said write-setting circuit, characterized in that the error correction circuit further comprises a classification circuit coupled to the output of said decoding circuit for classifying a newly received and decoded symbol in one of at least two classes on the basis of the probability of occurrence of the newly received symbol, the input of the classification circuit being coupled to another input of the write-setting circuit.

2. An error correction circuit for a receiving device as claimed in claim 1, characterized in that the write-setting circuit includes a reliability circuit and the information store comprises an additional storage element for each symbol address in the information store for storing a reliability bit associated with that symbol address, inputs of the reliability circuit being coupled to the classification circuit and to the information store for accessing the additional storage elements, for determining, from the additional storage element corresponding with the symbol address position of newly received symbol information, a new reliability bit, an output of the reliability circuit being coupled back to the information store for writing this new reliability bit into the corresponding additional storage element when the reliability bit for this symbol address changes its value.

3. An error correction circuit for a receiving device as claimed in claim 2, characterized in that the checking means comprises a comparison circuit for bit-wise comparing a newly received and decoded symbol with a symbol read from an address of the information store, this address corresponding with the symbol location, a comparison output of the comparison circuit being coupled to a further input of the reliability circuit.

4. An error correction circuit for a receiving device as claimed in any one of the preceding claims, characterized in that the classification circuit comprises a parity circuit for classifying newly received symbols for respective particular symbol locations into one of two classes which correspond to an even and an odd parity respectively, of the newly received information, and for classifying symbol information already stored in the corresponding symbol addresses in the information store.

5. An error correction circuit for a receiving device as claimed in claim 2, characterized in that the reliability circuit comprises a reliability flipflop and a reliability read circuit for this flipflop, an output of which also constitutes the output of the reliability circuit.

6. An error correction circuit for a receiving device as claimed in claim 1, characterized in that the error correction circuit comprises a second classification circuit, coupled between said other classification circuit and said write-setting circuit and having inputs coupled to said information store, for classifying a symbol read from the information store.

7. An error correction circuit for a receiving device as claimed in claim 1 characterized in that the information store comprises, for each symbol address in the information store, at least one further storage element for storing the classification associated with the symbol for that symbol address.

* * * * *

UNITED STATES PATENT AND TRADEMARK OFFICE
CERTIFICATE OF CORRECTION

PATENT NO. : 4,349,904

DATED : September 14, 1982

INVENTOR(S) : PETER J.H. JANSSEN ET AL

It is certified that error appears in the above—identified patent and that said Letters Patent is hereby corrected as shown below:

Claim 1, Col. 12, line 11 change "input" to --output--

Signed and Sealed this

Twenty-third Day of November 1982

|SEAL|

Attest:

GERALD J. MOSSINGHOFF

Attesting Officer

Commissioner of Patents and Trademarks